United States Patent [19]

Kluczynski et al.

[11] 4,008,737
[45] Feb. 22, 1977

[54] MULTI-PATH VALVE STRUCTURE WITH MEANS PROVIDING SMOOTH FLOW PATTERNS

[75] Inventors: Matthew L. Kluczynski, Chatsworth; Myrl E. Orme, Canoga Park, both of Calif.

[73] Assignee: The Bendix Corporation, North Hollywood, Calif.

[22] Filed: Aug. 26, 1974

[21] Appl. No.: 500,440

[52] U.S. Cl. .................. 137/625.3; 137/625.69; 251/127
[51] Int. Cl.² ................ F16K 47/08; F15B 13/04
[58] Field of Search ................ 137/625.3, 625.69; 251/127

[56] References Cited
UNITED STATES PATENTS

| | | | |
|---|---|---|---|
| 1,292,013 | 1/1919 | Munger | 137/625.67 |
| 2,380,705 | 7/1945 | Proctor | 137/625.25 X |
| 2,958,340 | 11/1960 | Rosebrook | 137/625.69 |
| 3,899,001 | 8/1975 | Orme | 137/625.3 |

*Primary Examiner*—Alan Cohan
*Assistant Examiner*—Gerald A. Michalsky
*Attorney, Agent, or Firm*—Robert C. Smith; William F. Thornton

[57] ABSTRACT

Multiple path means for a fluid flow control device is shown in connection with a typical spool type servo valve and a relief valve. The multiple path means consists of a stack of washer-like elements or disks which cooperate to define a number of finely divided flow paths across a stack of disks. To provide a configuration which is very economical of space, the disks are arranged such that the flow path turns back and forth through different planes. Groups of flow paths are defined by a number of groups of perforated disks confined between the imperforate disks. Two perforated disks having patterns of openings are positioned on opposite sides of a similar disk having a pattern of small orifices. By proper juxtaposition of the three or more disks, a circuitous flow pattern is established from a first chamber defined by a first slot and its side walls, axially through a series of small orifices to a second such chamber, substantially radially through said second chamber and axially in the opposite direction through more orifices to another such chamber and continuing in this manner across the stack of disks. The dimensions of the slots and orifices are chosen such that the velocity of flow through any orifice is maintained within a desired limit. To provide a substantially smoother flow vs. valve displacement relationship, the working faces of the valve lands are canted such that in a given position, edges of more than one of the disks of the stack are uncovered; or, alternatively, the stack of disks is canted such that the lands of the spool expose edges of more than one disk. In this manner, irregularities in the flow pattern caused when the lands of the spool pass a disk having no flow entrances are minimized. Also, the magnitude of flow irregularities are reduced by the number of flow paths opened during the spool displacement equivalent to one disk thickness; i.e., the more openings (one at a time), the smoother the flow pattern.

8 Claims, 14 Drawing Figures

MULTI-PATH VALVE STRUCTURE WITH MEANS PROVIDING SMOOTH FLOW PATTERNS

CROSS-REFERENCE TO RELATED APPLICATION

U.S. patent application Ser. No. 470,251 filed May 15, 1974, which is a continuation of Ser. No. 293,956 filed Oct. 2, 1972, (now abandoned) and patent application Ser. No. 476,969 filed June 6, 1974, now Pat. No. 3,899,001.

BACKGROUND OF THE INVENTION

In many flow control applications there is a need for structures which can vary the fluid-flow rate of flowing fluids without the production of noise and vibration. The term "throttling" is generally applied to the function of altering or adjusting fluid flow throughout a range of flow rates. The various structures by which the function is performed are generally called "throttling valves" to distinguish them from structures whose function is to open and close a flow path as a step function. To the extent that on-off valves are not opened and closed instantaneously, so that throttling noise and vaibration may be produced therein at the time of opening or closure, the invention described herein is applicable to such valves, as well, and they are included in the term throttling valve.

A typical control valve for handling the flowing of high pressure fluids employs a structure in which the cross-sectional area of the flow path is altered. This type of structure generally produces substantial noise and vibration and is quite subject and in damage from cavitation. However, the structures employed in this arrangement are, as a class, least expensive and most conveniently employed. Of particular interest herein is a structure for quieting of and prevention of damage to spool valves. In general the noise, vibration and cavitation generated in orificial valves is an incident to the Venturi effect which attends movement of the fluid through the orificial opening. The energy difference from throttling results in turbulence following the orifice where it is transformed into increased internal temperature of fluid and into acoustic energy in the form of noise transmitted through the fluid and in8c vibration damage to the surrounding structure. In extreme cases, the turbulence results in localized pressure reductions downstream from the orficial restriction sufficient to form vapor spaces or pockets. The vapor in these spaces is returned to liquid as the vapor bubble is imploded by the pressure of the medium surrounding the bubble. This phenomenon is called cavitation and results in noise and occasional damage to adjacent surfaces of the valve structure. It will be appreciated that there are many applications for which it is desired to substantially reduce both the noise and the valve damage in operation of spool valves. It is also suspected that some damage may result from a molecular shearing phenomenon wherein, because of forcing fluids such as hydraulic oil through small areas with very high pressure differentials, electrons are actually separated from oil molecules which may be replaced from the surrounding metal, thus causing another form of erosion.

There have been many structures devised in an attempt to deal with the noise, vibration and damage resulting from operation of valves in high pressure systems. Most of these have involved some form of baffling means which operate in one way or another to divide the flow into finely divided streams. One such arrangement is described in the copending application Ser. No. 470,251 referred to above, in which flow is divided into many fine streams by a series of stacked disks surrounding a spool valve and in which each small stream is caused to flow into a chamber, from thence across an orifice to another chamber, reversing direction through another orifice, etc., and so on radially across the disks. In this arrangement the pressure drops across the disks are essentially those caused by the orifices in series. One problem which has been experienced with this arrangement is that the disks containing the orifices are not configured to receive or discharge fluid, nor are the blank disks. Thus, particularly where a spool valve has very small travel, the thickness of these dead disks creates an irregularity in flow which it is preferable to avoid.

DESCRIPTION OF THE PREFERRED EMBODIMENT

Figure 1:
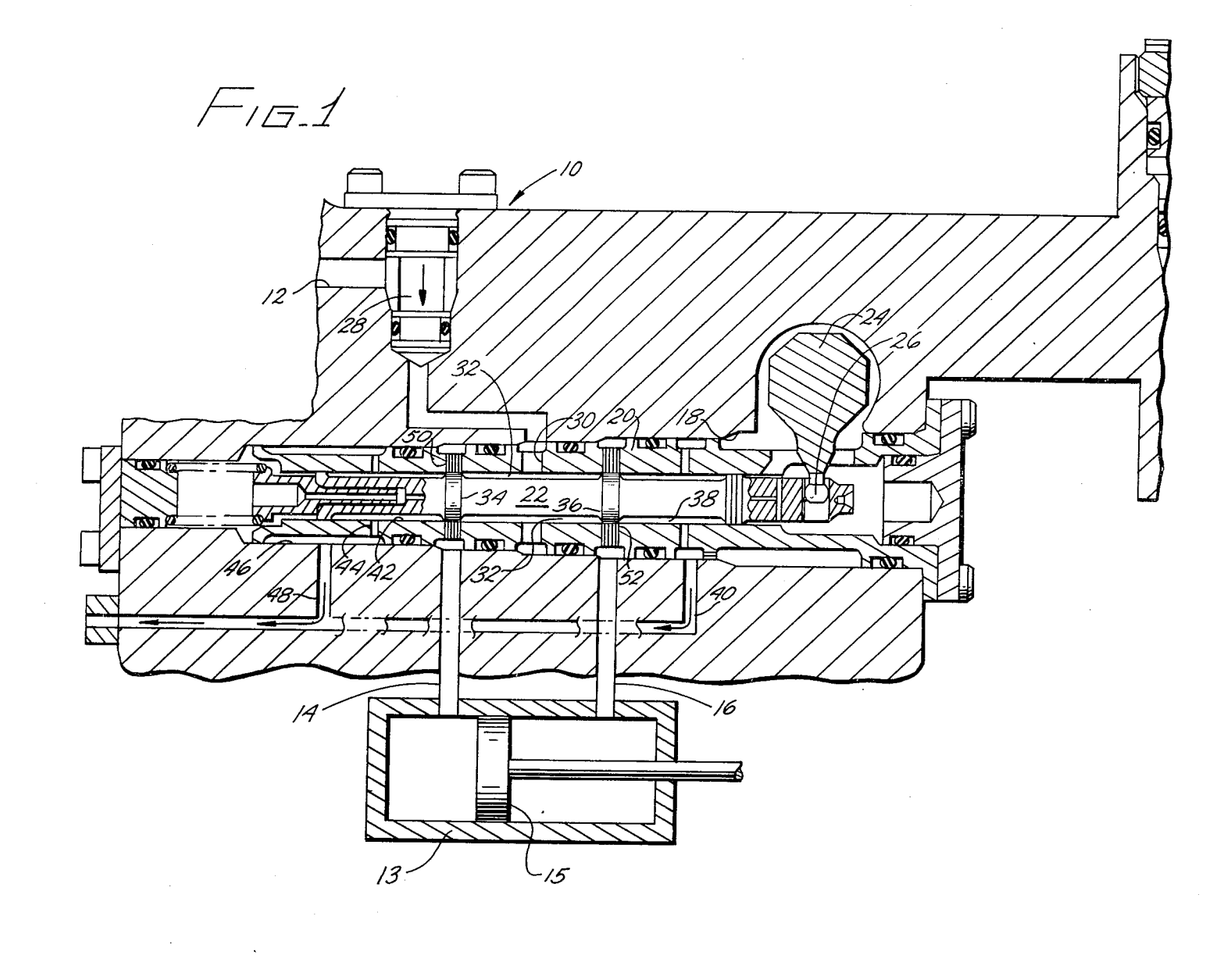
FIG. 1 is a cross-sectional view of a typical spool-type servo valve using our invention.

Referring to FIG. 1, a flow control valve is shown generally at numeral 10 whose purpose is to control flow to an external utilization device such as a hydraulic motor in the form of a cylinder and piston. Fluid from a source not shown is applied to an inlet passage 12, and flow from the valve member 10 is provided to an actuating cylinder 13 through outlet conduits 14 and 16 connected to opposite sides of a piston 15. Positioned within valve 10 is a generally cylindrical chamber 18 having a plurality of different diameters. The stationary sleeve member 20, having a plurality of matching diameters, is positioned in chamber 18. Axially movable within the sleeve 20 is a spool valve 22 which is directly driven mechanically by means of a rotatable control member 24 having an extendible arm 26 engagng the spool member 22.

Fluid flow entering inlet 12 passes a conventional check valve 28 and flows through an orifice or series of orifices 30 which are radially positioned through the side wall of sleeve member 20 to provide communication to a chamber 32. Defining the ends of chamber 32 are a pair of lands 34 and 36 movable axially with spool valve member 22 in such manner as to direct high pressure inlet fluid from chamber 32 into either of cylinder passages 14 or 16. When spool member 22 has moved toward the left, land 34 is similarly displaced, thus opening communcation between chamber 32 and passage 14. At the same time, land 36 also moves to the left, opening communication between passage 16 and a chamber 38 which communicates with return pressure through a line 40. This results in movement of piston 15 toward the right. Movement of the spool 22 in the opposite direction results in connecting high pressure fluid from chamber 32 to line 16 and permitting fluid on the left side of the cylinder 15 to be exhausted through passageway 14 into a chamber 42 which communicates with return conduit 40 through a line 44, a chamber 46 and a passageway 48, and causing piston 15 to be moved toward the left.

Surrounding each of lands 34 and 36 are stacks of disks 50 and 52, respectively, which are stacked in a face-to-face relationship and which include patterns of openings and orifices which divide the flow into a large number of flow paths for minimizing noie and/or cavitation or erosion damage to the valve which might otherwise result because of the high pressure differentials employed. It will be observed that with the particular valve configuration shown, flow may be directed across the disks either from inside to outside or from outside to inside, depending upon which set of disks is considered and which direction the spool 22 is moved. Because of the smaller effective area on the internal diameter, it is frequently important in this type of valve that the flow versus displacement relationship be reasonably smooth and that abrupt changes do not occur as the spool is moved across one disk element and then another.

Figure 2:
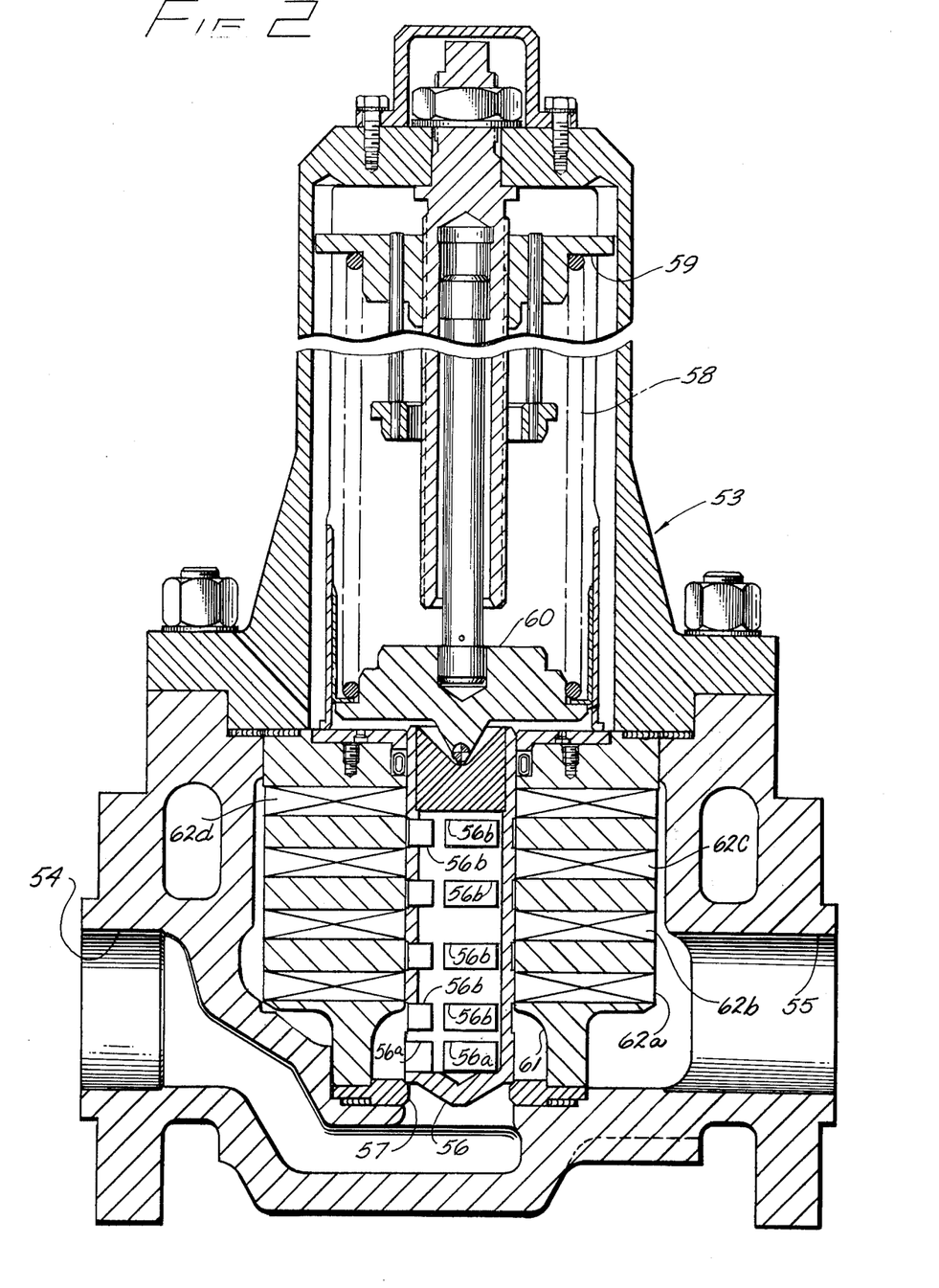
FIG. 2 is a cross-sectional view of a relief valve using our invention.

In FIG. 2, a form of relief valve used as a back pressure regulator is shown generally at numeral 53 having an inlet passage 54 and an outlet passage 55. A poppet valve member 56 is urged against a seat 57 by means of a spring 58 held between retainer members 59 and 60. Poppet valve member 56 includes a plurality of openings 56a which permit flow into its hollow interior from a chamber 61 downstream of seat 57. As poppet valve 56 moves upwardly, greater amounts of registry will occur between other openings 56b in its side wall and a plurality of groups of quieting elements 62a, 62b, 62c and 62d. Each group consists of a stack of disks or washer-like members which are positioned relative to each other such that a number of finely divided flow paths permit flow from inside to outside across the disks. The disk structure and flow pattern are described in detail below. As the fluid flows across the stacks, it reaches outlet passage 55 from whence it will normally flow to a low pressure source, such as to a reservoir or the inlet side of a pump.

Those skilled in the art will recognize that if the valve 53 operates to hold fluid pressure at a fairly high level and then suddenly vents fluid to a substantially lower pressure, there will be a tendency for operation of the poppet valve 56 to be accompanied by a loud noise and, possibly, cavitation. Those skilled in the art will also recognize that when the cracking pressure and reseat pressures of a relief valve are numerically close to one another, the possibility of internal leakage increases. As in any leak or orifice flow which has a large differential pressure, the leak will gradually become larger due to increasing valve damage at the leak. If left uncontrolled, the leak will increase to a point that is unacceptable; i.e., the leakage flow is too large. The increase in valve leakage can be greatly reduced by use of the arrangement shown, wherein the resulting flow is divided into many fine parallel flow paths each having structure giving rise to numerous pressure drops, all of which are limited to pressure differentials such that the noise across each pressure drop is very slight. At the same time, the control of pressure differentials results in avoiding erosion with the usual damage to valve and seat structure.

Figure 3:
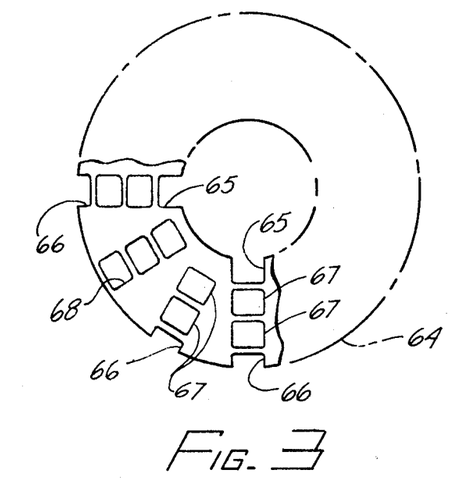
FIG. 3 is a plan view of one type of disk used in either of FIGS. 1 and 2.

The configuration of the individual disks shown in groups 50 and 52 will become apparent from consideration of the following figures. FIG. 3 shows a disk 64 having a pattern of openings thereacross. Radial orientation of these openings is significant in understanding the various flow paths. Openings from the outside edge are shown at numerals 66 which are positioned at clock positions corresponding to 6 o'clock, 7 o'clock and 9 o'clock. Similar openings (not shown) are at 10 o'clock, 12 o'clock, 1 o'clock, 3 o'clock and 4 o'clock. On the inside diameter, openings 65 appear at the 6, 9, 12 and 3 o'clock positions. A plurality of openings 67 are radially aligned with openings 66 and 65 but not directly connected thereto. Located at the 8 o'clock position are a plurality of openings 68 which are radially aligned in sets, but it will be observed that the set of openings 68 is misaligned as to distance along a radius with respect to openings 66 and 67. Similar sets of openings 68 occur at the 11, 12 and 5 o'clock positions around the disks 64.

Figure 4:
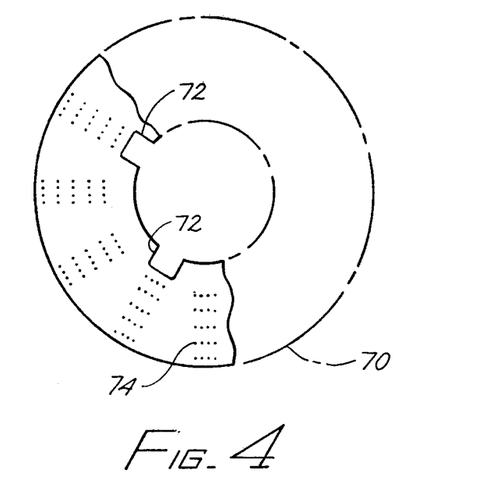
FIG. 4 is a plan view of a second type of disk used in FIGS. 1 and 2.
Figure 5:
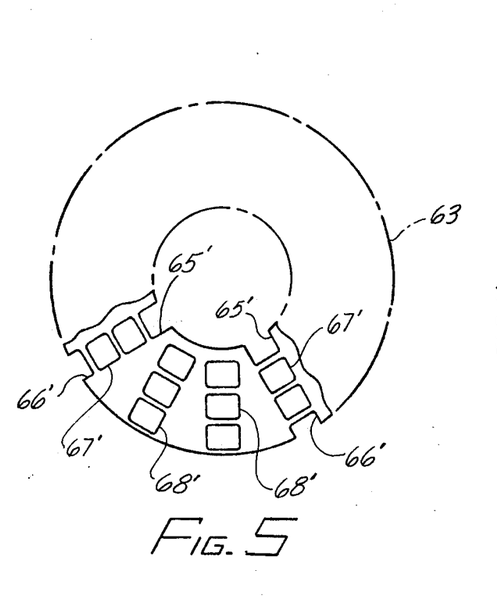
FIG. 5 is a plan view of another disk similar to that of FIG. 3 but radially displaced.

The disk shown in FIG. 4 is an orifice plate 70 which is positioned next to plates such as those shown in FIG. 3, and its radial orientation corresponds to that of FIG. 3. Orifice plate 70 includes a number of sets of fine orifices 74 which correspond in position with portions of the openings 66, 65, 67 and 68 described in connection with FIG. 3. In FIG. 4 is will be observed that there are openings 72 at the 7 and 10 o'clock position communcating with the inside diameter of disk 70. Similar openings appear at the 1 o'clock and 4 o'clock positions of disk 70. FIG. 5 shows a disk 63 which may be identical to that of FIG. 3. As shown, it is somewhat different as to position of the openings and is rotated one-twelfth, or one clock position, counterclockwise with respect to FIG. 3 such that openings 66' which correspond to openings 66 of disk 64 are now at the 5 and 8 o'clock positions, respectively, and the radially aligned openings 67' are similarly rotated from the positions of openings 67. At the 6 o'clock position of disk 63 the pattern differs from that at the 7 o'clock position of disk 64 in that the disk 64 has an outside opening 66, and there is no such opening in disk 63. These disks are then assembled in such manner that disk 70 would be placed between disks 64 and 63, preserving the radial orientation shown and in as many sets as desired.

Figure 6:
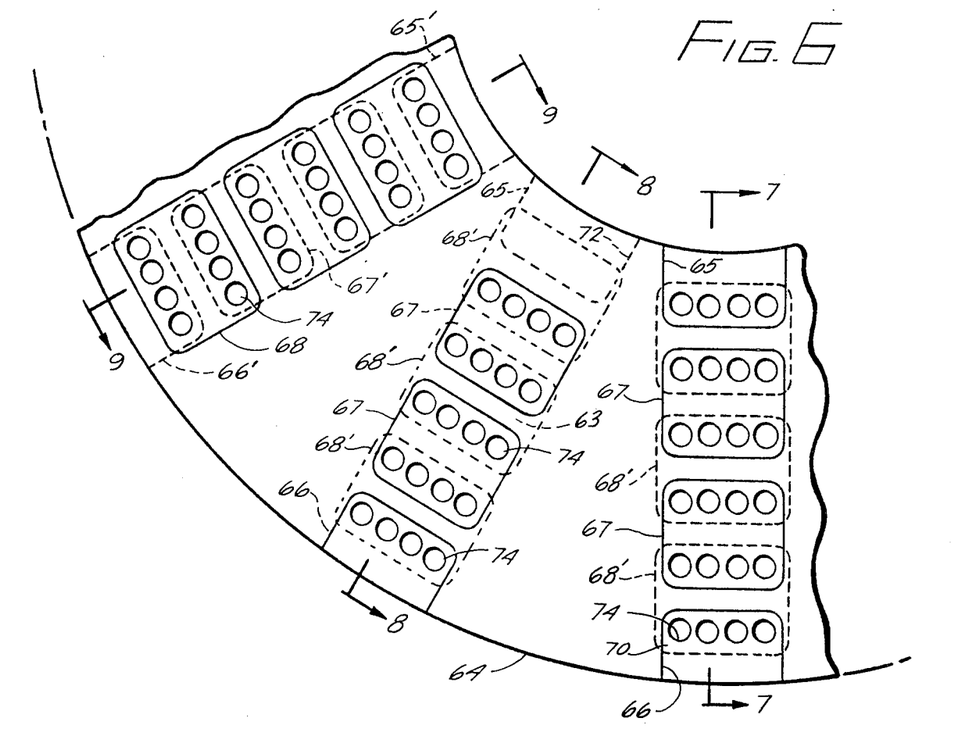
FIG. 6 is an enlarged plan view, partly in phantom, of a group of the disks of FIGS. 3, 4 and 5 as assembled.
Figure 7:
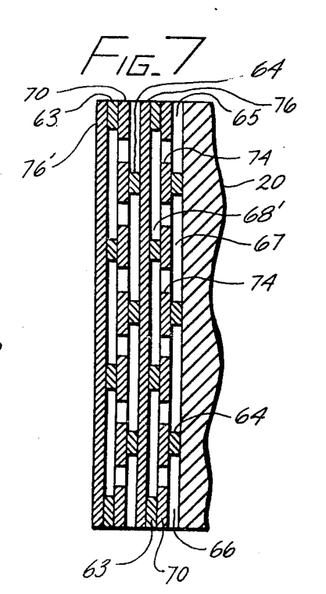
FIG. 7 is a sectional view taken along line 7—7 of FIG. 6.

An enlarged composite view showing this arrangement appears in FIG. 6. In FIG. 6, the disk 64 is shown in the top position, showing an opening 66 at the outside edge of the 6 o'clock position and a similar opening 65 at the inside edge. Openings 67 are radially aligned with openings 66 and 65, and these directly overlie the orifice plate 70, and a plurality of the small orifices 74 formed in plate 70 are visible through openings 65, 66 and 67. Shown in phantom outline and enlarged slightly to distinguish them from the openings in disk 64 are a pluality of openings 68' which are radially aligned with the openings 65, 66 and 67 but misaligned along the radius therewith. Thus it will be seen that at the 6 o'clock position fluid may flow into the opening 66 or into the opening 65, depending upon the direction of flow at a given time. FIG. 7 shows a cross-sectional view taken through two stacks of disks arranged as shown in FIG. 6 at the 6 o'clock position. Disk 64 will be seen abutting directly against the surface of sleeve 20 with openings 65 and 66 on the inside surfaces, respectively. The next disk shown toward the left is the orifice disk 70 which includes a plurality of the small orifices 74. No opening into this disk is shown in the 6 o'clock position. Adjacent disk 70 is the disk 63 which, as set forth above, is similar to disk 64, except for the extra openings 67, but rotated one-twelfth or one clock position such that it has no openings at this position communicating with the inside or outside surfaces. At this 6 o'clock position, flow may proceed into the opening 65, across an orifice 74 into a chamber defined by an opening 68', across another orifice 74 to a chamber defined by opening 67, across another orifice 74 to another chamber defined by opening 68', etc., and finally leaving the stack at opening 66. The flow may also be in the opposite direction from outside to inside. It will be observed that in this set there is also a fourth disk 76 which is a blank. Following disk 76 is an additional set of disks 64, 70 and 63 which function exactly as described. A further blank disk 76' is shown at the end. Alternatively, the set could be closed off by another portion of the sleeve 20. There may be as many similar sets of disks as are required to provide the desired flow rates.

Figure 8:
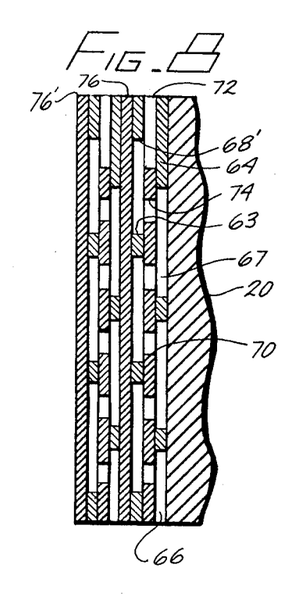
FIG. 8 is a sectional view taken along line 8—8 of FIG. 6.

Referring again to FIG. 6 and specifically to the arrangement shown at the 7 o'clock position, it will be observed that the openings 68 again overlie sets of orifices 74 of plate 70 and that these in turn overlie openings 65', 66' and 67' in plate 63. In this position it will be observed that the openings into the stack are not at the top but are one layer down in disk 70 at the inside surface and two layers down in disk 63 at the outside surface. Again, this may become somewhat more straightforward from consideration of the sectional view shown in FIG. 8 where, as before, the disks 64, 70 and 62 are shown confined between a portion of the sleeve 20 and the blank disk 76. In this case it will be observed that the flow is from the inside of the stack into an opening 72 in the second disk 70 from whence it flows into a chamber defined by opening 68' in disk 62, across an orifice 74 in disk 70 and from there into a chamber defined by an opening 67 in disk 64. Flow then continues in the opposite direction across another orifice 74 into the chamber defined by an opening 68' and so on through the stack, exiting at an opening 66, as described. It will be observed that in the 7 o'clock position there is an opening at the second disk position at the inside diameter, but only in the first disk position at the outside diameter.

Figure 9:
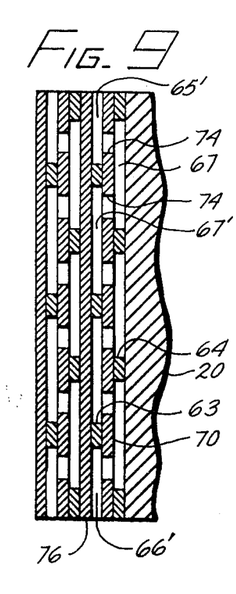
FIG. 9 is a sectional view taken along line 9—9 of FIG. 6.

Referring now to FIG. 9, which is a cross-section of FIG. 6 taken at the 8 o'clock position, it will be observed that there is no opening to either the inside or outside surfaces of the disk 64 and no such opening on the disk 70, but there is an opening 65' in the disk 63 at the third disk position. Flow into opening 65' proceeds across an orifice 74 in the orifice plate 70 into the chamber defined by the opening 67, from thence across plate 70 in the opposite direction through another orifice 74 into a chamber defined by opening 67', and continuing in the manner described until the flow leaves the stack at an opening 66'. Again, a blank disk 76 cooperates with the openings 67' and 68' to define their respective chambers. The disks in the stacks shown are preferably fastened together to form rigid units, as by brazing. If this is not done, it is possible for flow patterns to become disturbed through misalignment of the disks and for mechanical vibrations to be introduced.

Figure 10:
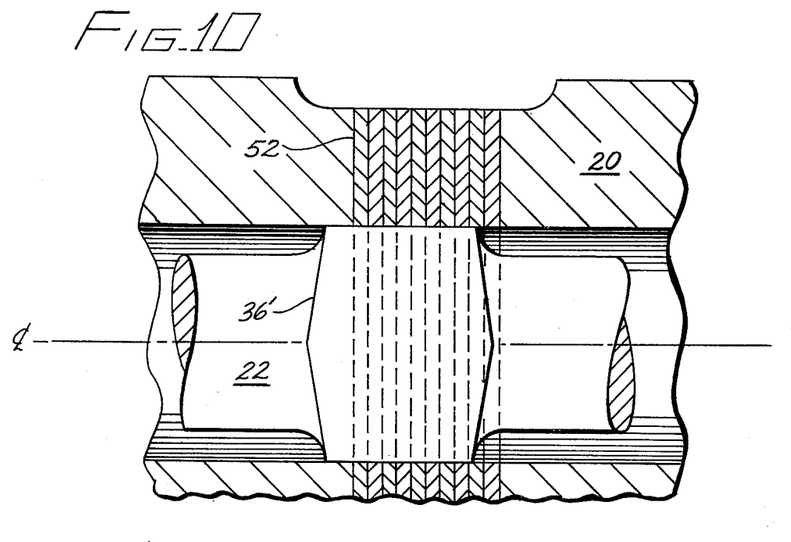
FIG. 10 is a sectional view of an enlarged portion of FIG. 1, partly in phantom, showing a spool land having skewed or canted edges.

FIG. 10 is a greatly enlarged view of the portion of FIG. 1 showing the spool 22 with land 36, the stack of disks 52 and the adjacent portions of sleeve member 20. In this view the land 36 is shown as having tapered or canted working edges such that as it is displaced somewhat from its center position, it exposes only a portion of the edge of the first disk along with any openings therein (not shown in this view). Since the amount that land 36 is tapered or canted is preferably somewhat greater than the width of a given disk, a portion of the second disk may also be exposed along with any openings therein. A somewhat greater movement of land 36 toward the left will expose all of the openings in the first disk and a larger proportion of the openings in the second disk. It may also then begin to pick up some openings in the third disk.

Figure 11:
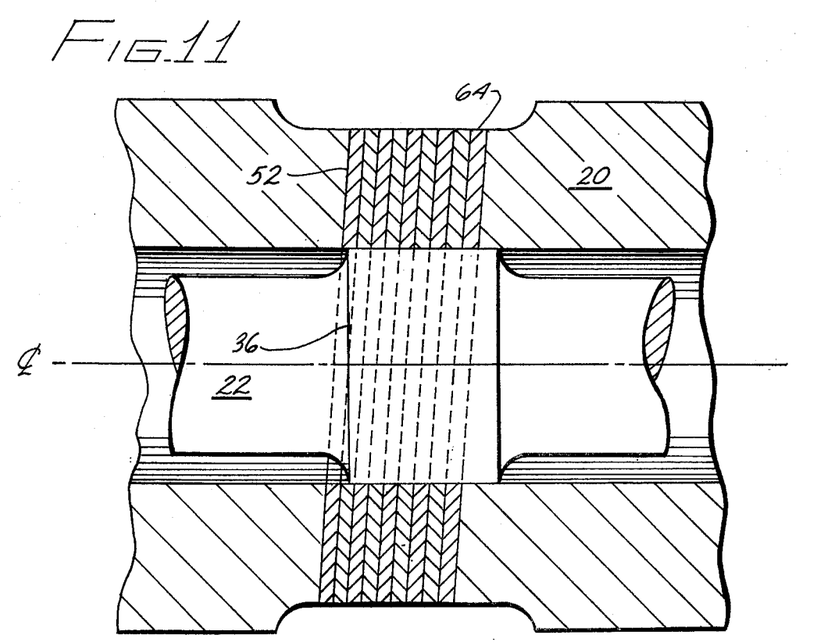
FIG. 11 is a sectional view of an enlarged portion of FIG. 1, partly in phantom, showing skewed disks and a spool land having straight edges.

A somewhat analogous arrangement is shown in FIG. 11 which is quite similar to that of FIG. 10 except that the land 36 has its working faces cut straight in the conventional manner and the stack of disks 52 is shown canted with respect to the land 36. Again, the land 36 is shown displaced, this time toward the right, so that it has uncovered most, but not all, of the edge of the first disk on the left. It has also begun to expose a portion of the second disk so that any openings in the portion exposed will begin to admit or discharge fluid. Further movement of spool 36 toward the right will open all of the area of openings on the first disk and a greater part of those on the second disk, gradually picking up a portion of the openings on the third disk, as well.

Figure 12:
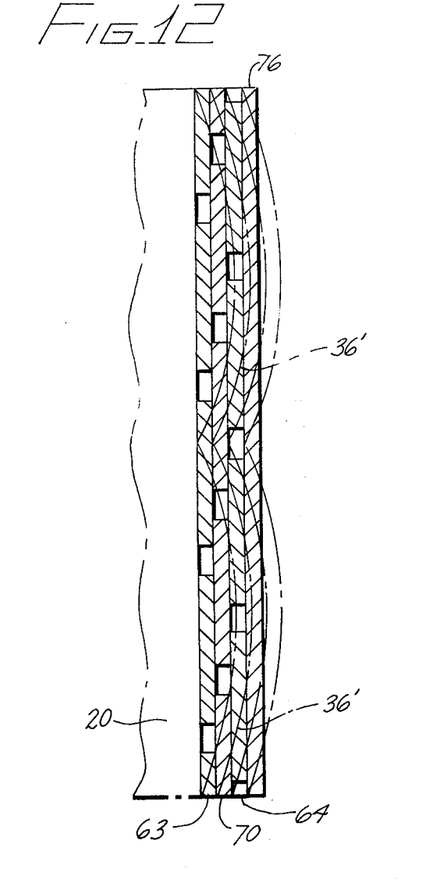
FIG. 12 is a development of the spool and disk arrangement of FIG. 10.
Figure 13:
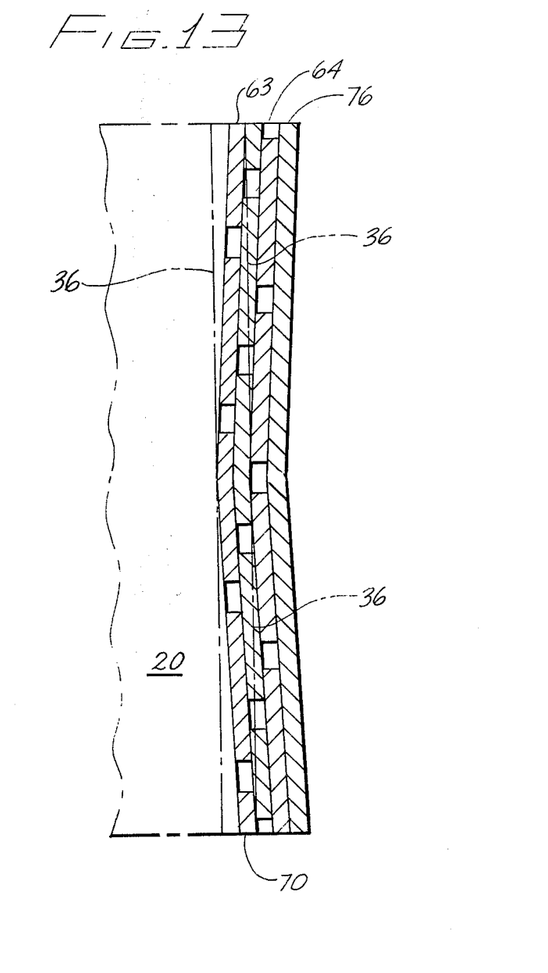
FIG. 13 is a development of the spool and disk arrangement of FIG. 11.

Perhaps a better understanding of the operation of the devices shown in FIGS. 10 and 11 can be obtained from consideration of the developed views shown in FIGS. 12 and 13. FIG. 12 shows a development of the arrangement of FIG. 10, and FIG. 13 shows a development of the arrangement of FIG. 11. In each of FIGS. 12 and 13 the pattern of orifices affording entry into the disk is essentially the same as that described with respect to FIGS. 3 through 9. Thus, in FIG. 12 will be seen a blank disk 76 at the right edge followed by disks 64, 70 and 63 in successive positions positions toward the left. If the 12 o'clock position is considered as being split between the top and bottom of the figure with 6 o'clock at the center, it will be recognized that disk 64 shows openings at the 3, 6, 9 and 12 o'clock positions. Similarly, disk 70 has openings at the 7, 10, 1 and 4 o'clock positions, and disk 63 has openings at the 2, 5, 8 and 11 o'clock positions. Successive positions of the working face of land 36' are shown as it moves across the face of the disk members. In the position shown farthest to the right, the land 36' covers all of the openings, and no flow will result. In the next position to the right, the land has uncovered a substantial portion of the openings at 12 o'clock and at 6 o'clock but has not exposed openings in disk 64 at 3 o'clock and at 9 o'clock. In the fourth position shown toward the left, the face of land 36' has uncovered substantially all of the openings in disk 64 and the openings in disk 70 at 1 o'clock, 7 o'clock and a small portion at 10 o'clock.

FIG. 13 shows a smaller development for the construction shown in FIG. 11 wherein the stack of disks is canted. Again, the arrangement or orifices into the stack is essentially that shown in FIGS. 3 through 9. The working face of land 36 is shown moved to a position exposing a substantial part of the openings in disk 64. In disk 70, openings at 1 and 10 o'clock are exposed to permit a limited amount of flow thereinto, but openings at 4 and 7 o'clock are substantially covered. No openings in disk 63 are exposed. In a second position shown in phantom, land 36 is moved to the left an amount sufficient to uncover all of the openings in disks 70 and 63.

Figure 14:
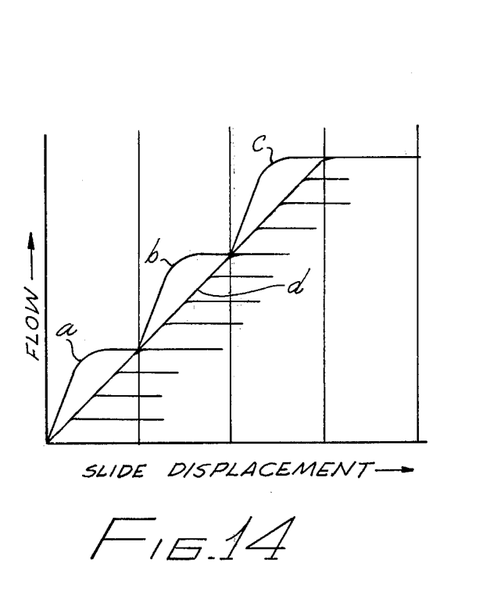
FIG. 14 is a graph showing the relationship of flow vs. displacement of a valve like that described in connection with the above figures.

FIG. 14 is a graph showing flow vs. displacement characteristics of a valve such as that shown in FIG. 1. If the lands on the spool are essentially straight and the stack of disks is not canted, the flow vs. displacement characteristic will be similar to that shown in curve a, b, c. The flow vs. displacement relationship shown as the spool moves across the edge of disk 64 is shown in a portion of the curve marked a. It will be observed that this characterstic is such that as the spool moves across the disk and the opening becomes substantially larger, flow first increases quite rapidly and then increases less rapidly as the displacement approaches the width of the disk 64. Further movement will begin to uncover the openings 72 in disk 70 and gives rise to a further rapid increase in flow which then slows to a smaller value as the displacement approaches the width of disk 70, as shown in the portion of the curve marked b. As the disk 63 is uncovered by the spool, flow again increases rapidly, and an essentially similar characteristic is shown as the spool proceeds across the opening 65' in disk 63. It will be appreciated that no change in the flow occurs with further displacement across the blank disk 76 after which the identical pattern of increased flow occurs as the spool moves past the second set of disks. Were there several sets of such disks, this pattern would continue to be repeated with a short interval of no increase wherever a blank disk is passed.

Where the stack of disks is tilted or canted as described herein, however, or where the face of the land is canted as shown in FIG. 10, a much smoother relationship results such as that shown in curve d. In this instance, the irregularities in flow are reduced to some fraction of those experienced without a canted disk or land, the actual amount of the reduction varying with the number of orifices and, to some extent, with the angle of the canting or slanting of the disk or land face. Preferably this angle or slant should be in an amount such that it somewhat exceeds the width of one orifice disk. Since the orifice disks are typically of a thickness of approximately .010 inch and the blank disks may be as thin as 0.005 inch, it will be appreciated that a slant or canting of approximately 0.015 inch extending across the diameter of the land will produce a desirable flow pattern.

Modifications will become apparent to those skilled in the art. While the above embodiment has been described in groups of three disks defining flow chambers and orifices defined by blank disks or blank surfaces, different numbers may be used. Particularly, where the disks may be substantially larger and where the inner diameter may be larger in proportion to the outer diameter than in the embodiment described herein, the circumference of the disks might be divided into segments of 16 or 24, for example, rather than 12 as described. In such case, the number of disks in a set between blanks may be 4 or 6, thus reducing the number of blank disks in proportion to the whole, thereby providing an even smoother flow vs. displacement relationship. The thicknesses of the orifice disks and the plain disks referred to above, as well as the angle of canting of the land faces or the disks, is largely a matter of meeting the requirements of any given application and may depend upon such factors as the amount of spool displacement or travel of the movable valve member, requirement for smooth flow, etc. As is apparent from consideration of FIG. 14, the canted disk or land produces a substantial improvement in the linearity of flow vs. displacement. This teaching may be adapted to valves other than the specific types shown. Normally the disks which are used to form the stack 50 or 52 may be formed in a circular manner, whether used canted or straight, since the amount of the angle is so slight that there is no need to compensate for this angle by elongating the disks.

We claim:

1. In a flow control valve wherein a spool valve member including at least one land is movable within a sleeve to open and close fluid passageways in said valve, a rigid structure forming part of said sleeve for dividing the flow entering and leaving said passageways into a plurality of streams comprising a stack of laminar disks having abutting faces and internal edge surfaces adjacent said pool member, said disks including a first group having a pattern of openings therethrough including a pattern of slots affording entry into said stack, a first subgroup of said group being radially oriented in a desired position and a second subgroup of said group being radially displaced from said subgroup such that the openings therein overlap but do not directly register with openings in said first subgroup, a second group of disks having a pattern of orifices therethrough interposed between members of said first and second subgroups, said orifices individually being of substantially smaller area than said openings and providing communication between members of said first and second subgroups, and a third group of imperforate disks positioned between selected pairs of disks of said first group for confining flow to generally radial flow patterns across said stack, one of said land and said stack of disks being canted relative to the other such that as said land moves past said stack, slots arranged around the inside circumferential edge of any of said disks are progressively uncovered.

2. A flow control valve as set forth in claim 1 wherein said stack of disks is canted relative to said spool valve and said land.

3. A flow control valve as set forth in claim 2 wherein said disks in said stack are brazed together to form a rigid structure.

4. A flow control valve as set forth in claim 1 wherein the edges of said land are canted relative to said stack of disks and the axis of said spool valve.

5. A flow control valve as set forth in claim 1 wherein said second group of disks includes a pattern of slots affording entry into said stack, which slots are radially displaced from the slots of either of said first or second subgroups but communicating with openings in at least one of said subgroups.

6. A valve comprising
a flow path including an opening to said flow path;
means for closing said opening in variable degree;
and means for dividing the flow through said opening into a plurality of streams comprising a stack of members across said opening having abutting faces including a first group of said members having passageways therethrough arranged in a series of patterns across the width of said members, said patterns including slots admitting flow into said stack only at certain intervals around the edges of said members, a second group of said members wherein a single member of said second group is interposed between two members of said first group, members of said second group having a series of orifices therethrough substantially smaller than said passageways and registering with said passageways, each of said two members having its passageways in registry with the orifices in said single member but offset with respect to each other, and
a third group of said members which about against opposite faces of at least some of said first group of members to confine said streams to a plurality of generally serpentine paths across said stack, said passageways defining chambers of cross-sectional area substantially exceeding the area of said orifices, said members in said stack being canted such that as said closing means moves across said opening, slots arranged around the diameter of said members are progressively uncovered.

7. A valve as set forth in claim 6 wherein said second group of said members includes a pattern of slots affording entry into said stack, which slots are radially displaced from the slots of either of the adjacent members of said first group, but communicating with passageways in at least one of said adjacent members.

8. A valve as set forth in claim 6 wherein said members in said stack are brazed together to form a rigid structure.

* * * * *